United States Patent [19]

Ichida

[11] 4,216,748
[45] Aug. 12, 1980

[54] INTERNAL COMBUSTION ENGINE WITH SUBSIDIARY COMBUSTION CHAMBER

[75] Inventor: Katsumi Ichida, Komae, Japan

[73] Assignee: Honda Giken Kogyo Kabushiki Kaisha, Tokyo, Japan

[21] Appl. No.: 38,837

[22] Filed: May 14, 1979

[30] Foreign Application Priority Data

May 16, 1978 [JP] Japan ................................ 53-57170

[51] Int. Cl.³ .............................................. F02N 13/06
[52] U.S. Cl. ...................................... 123/253; 123/432
[58] Field of Search ............ 123/75 B, 75, 127, 32 ST, 123/32 SP, 191 SP, 32 AA, 122 AB, 90.27, 52 M, 188 M, 193 H, 90.22

[56] References Cited

U.S. PATENT DOCUMENTS

| | | | |
|---|---|---|---|
| 3,219,019 | 11/1965 | Palmer | 123/90.00 |
| 3,556,060 | 12/1966 | Biaband | 123/75 B |
| 3,633,577 | 3/1970 | Piatti | 123/90.22 |
| 3,890,942 | 6/1975 | Date | 123/32 SP |
| 3,903,849 | 9/1975 | List et al. | 123/75 B |
| 3,916,847 | 11/1975 | Nakuno et al. | 123/75 B |
| 3,982,507 | 9/1976 | Aeaka et al. | 123/75 B |
| 4,018,196 | 4/1977 | Linder et al. | 123/52 M |
| 4,132,197 | 1/1979 | Hanawa et al. | 123/75 B |

FOREIGN PATENT DOCUMENTS

| | | | |
|---|---|---|---|
| 2039462 | 10/1973 | Fed. Rep. of Germany | 123/75 B |
| 2509133 | 9/1976 | Fed. Rep. of Germany | 123/75 B |
| 1454910 | 11/1976 | United Kingdom | 123/75 B |

*Primary Examiner*—Charles J. Myhre
*Assistant Examiner*—R. A. Nelli
*Attorney, Agent, or Firm*—Haseltine, Lake & Waters

[57] ABSTRACT

The present invention discloses an internal combustion engine having an auxiliary combustion chamber in which a principal chamber is provided having (a) two intake valves and an intake port connected thereto and, (b) on the opposite side of a vertical plane extending along an axial line centered at the crank shaft and the center of the cylinder, a single exhaust valve and an exhaust port connected thereto, the same being in communication with the auxiliary combustion chamber.

8 Claims, 7 Drawing Figures

INTERNAL COMBUSTION ENGINE WITH SUBSIDIARY COMBUSTION CHAMBER

BACKGROUND OF THE INVENTION

The present invention relates to an internal combustion engine having an auxiliary combustion chamber, the same being applicable mainly to automotive vehicles such as cars.

Engines of the present type have been heretofore known in that a principal combustion chamber at an inner portion of the interior of the cylinder has been provided on its upper side with an auxiliary combustion chamber, the same being in communication with the principal chamber through a so-called torch passage. It has been typical with engines of the above type that the principal combustion chamber is provided with one intake valve connected to an intake port and one exhaust valve connected to an exhaust port. This arrangement, however, has proven troublesome as a result of the difficulty which is attendant in developing an engine which will produce the required large horsepower needed to support an auxiliary chamber. More particularly, prior art engines of the present type have required especially large principal chambers for the system to operate in the comtemplated fashion.

The present invention is intended to surmount the above shortcomings in the prior art.

SUMMARY OF THE INVENTION

The present invention comprises an internal combustion engine having an auxiliary combustion chamber of a type having a principal combustion chamber at an upper portion of the interior of one cylinder, said principal chamber being provided on its upper side with an auxiliary combustion chamber which is in communication therewith through a torch passage. The invention is characterized in that the main combustion chamber is provided, at one side of a vertical plan extending along an axial line centered upon the crank shaft in the center of the cylinder, with two intake valves and an intake port connected thereto and, on the other side of the above defined plan, a single exhaust valve and an exhaust port connected thereto as well as to the auxiliary combustion chamber.

It is an object of the present invention to provide a twoportion combustion chamber having improved efficiency over the prior art.

Yet further objects will become apparent from the attached drawings and the Detailed Description of the Invention.

DETAILED DESCRIPTION OF THE INVENTION

Figure 1:
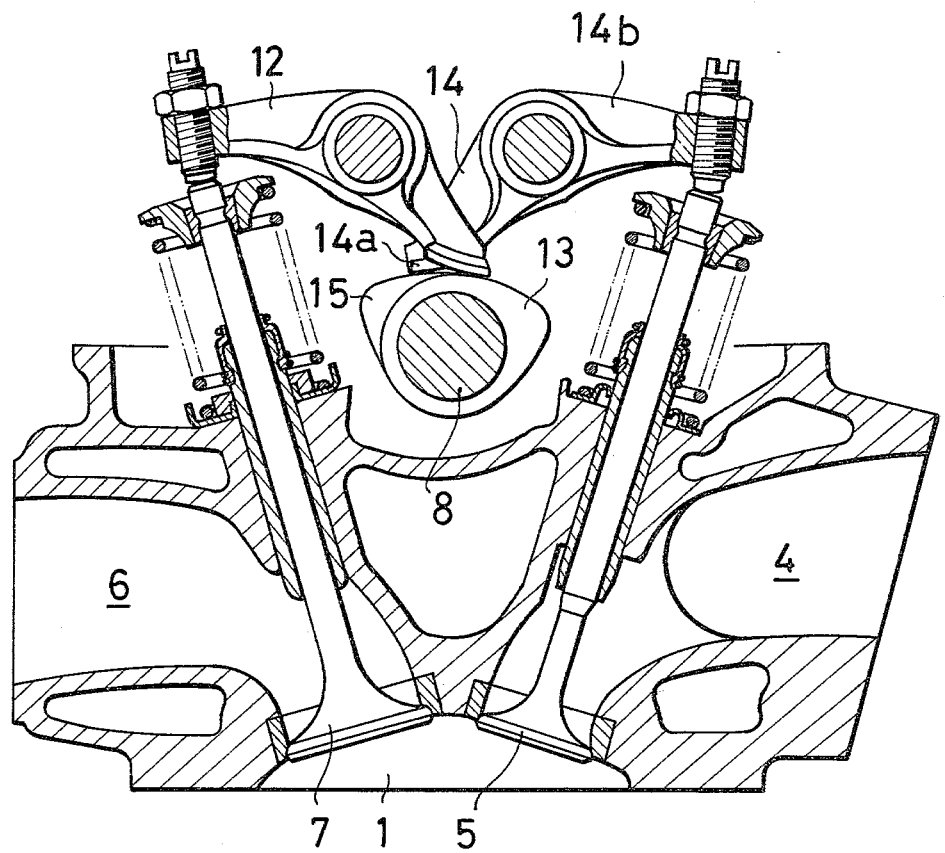
FIG. 1 is a sectional view of a first embodiment of the present invention.

Referring to the drawings, reference numberal 1 denotes a main combustion chamber provided at an upper portion of the interior of one cylinder of an internal combustion engine. The chamber 1 is provided on its upper side with a subsidiary combustion chamber 3 which is in communication therewith through a torch passage 2. The main combustion chamber 1 is provided on its upper surface with an intake valve 5 connected to an intake port 4 having an exhaust valve 7 connected to an exhaust port 6. Additionally, above the chamber 1 is a cam shaft 8 for the facilitation of valve operation. The subsidiary combustion chamber 3 is composed of a surrounding cup-shaped collar and is provided on one side thereof with an ignition plug 9.

The above arrangement is not especially different from that of a conventional engine. According to this invention, there are provided two intake valves 5. In the present improved arrangement, the two intake valves are disposed on one side with the intake port 4 connected thereto, while the said single exhaust valve 7 is disposed on the other side with the exhaust port 6 connected thereto. Accordingly, the engine is thus constructed as a cross-flow type.

Figure 2:
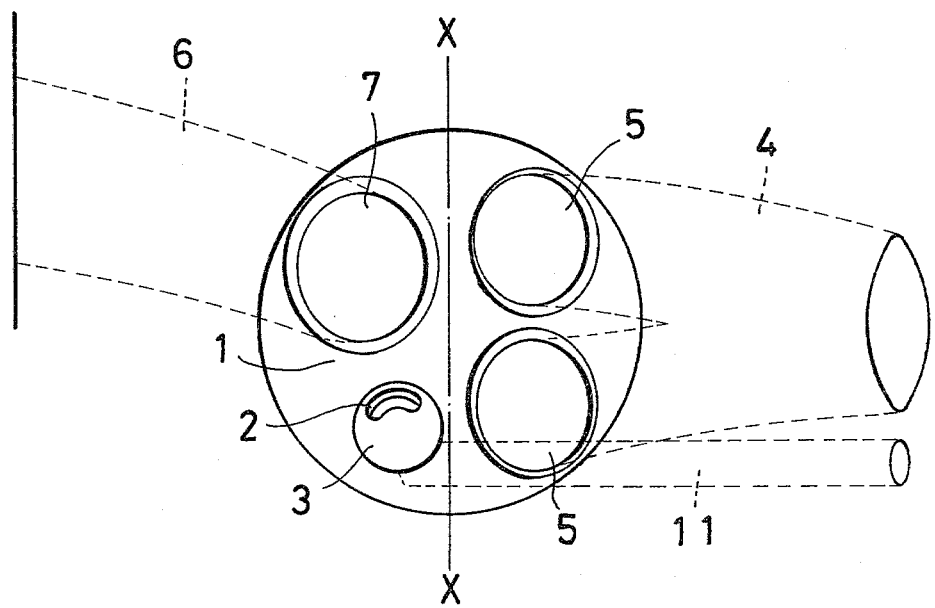
FIG. 2 is a bottom side view of the invention.
Figure 3:
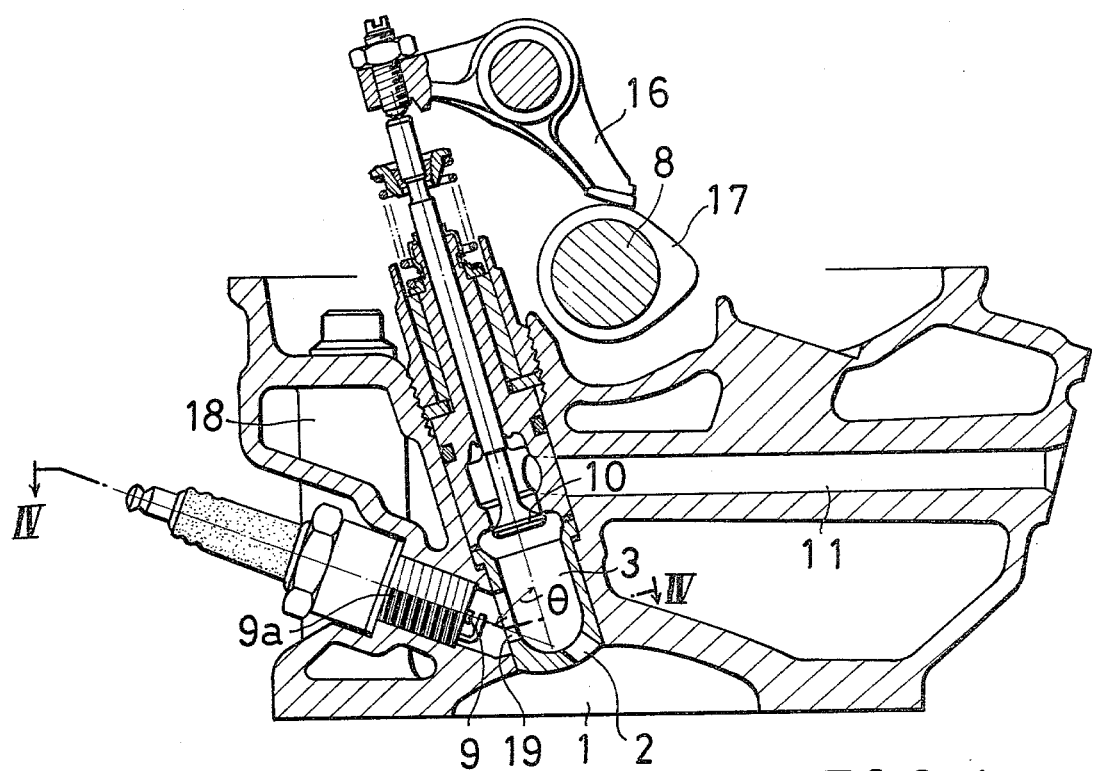
FIG. 3 is a side sectional view of the auxiliary combustion chamber portion.

With reference to FIG. 2, it is seen that the upper surface of the main combustion chamber 1, the two intake valves, and the common intake port 4 connected thereto, are disposed on one side of a vertical plan X—X extending along the axial line of a crankshaft 5, said line including the center of the cylinder, the one exhaust valve 7 and the exhaust port 6 connected thereto. Additionally, the auxiliary combustion chamber 3 is disposed on the other side of the plane X—X.

With reference to the operation of the present invention, the main combustion chamber 1 is supplied with a mixture from one side thereof, and the resultant burned exhaust gas is discharged from the other side thereof, in accordance with the standard method of operation of a cross-flow engine. However, in this case, the mixture is supplied through the two intake valves so that the charging efficiency of the intake mixture can be increased and, consequently, the engine output can be improved. Additionally, the two intake valves together with the intake port 4, connected thereto, are located on one side, so that the intake can be effected through a comparatively short passage and the intake resistance can be decreased and, thus, the intake mixture contributing to the output can be readily taken in without delay. This is further effective in improvement in the engine output.

Additionally, in this arrangement, the chamber wall portion of the main combustion chamber 1 is far from the subsidiary combustion chamber 3 which is located near the intake valves 5 so that, even in the event that the chamber wall of the main combustion chamber 1 becomes comparatively high in temperature through an increased compression ratio during high output, the foregoing chamber wall portion will be cooled by the intake mixture and will be kept at a comparatively low temperature. Thus "knocking" can be prevented without any lowering in the efficiency of the engine.

In accordance with the inventor's investigations, it is preferable that the intake valve 5 and the exhaust valve 7 be as large in diameter as is possible within the constraints of the following relationship:

$$2d_s{}^2 = 1.3 - 1.4 d_e{}^2$$

Where $d_s$ is the diameter of the intake valve 5; and $d_e$ is the diameter of the exhaust valve 7.

In the illustrated embodiment, the auxiliary combustion chamber 3 is provided with an auxiliary intake valve 10 and an auxiliary intake port 11 extending therefrom through said intake valve 10. In said embodiment, the port 11 extends towards the foregoing one side, that is, the side of the intake port 4. The port 11 is comparatively small in diameter, this being not especially different from a conventional design and, as such, the same is comparatively easy to construct. If the port should extend towards the side which is opposite to the above described side, i.e., the other side of the engine, then the engine would become complicated in construction and increased in length; this has been found to be undesirable.

The auxiliary intake port 11 serves to supply a comparatively rich mixture which is not otherwise different from a conventional full mixture. Thus, such a rich mixture can be supplied without large variation in the combustion or engine timing, so that the same will not particularly influence the engine design.

Figure 5:
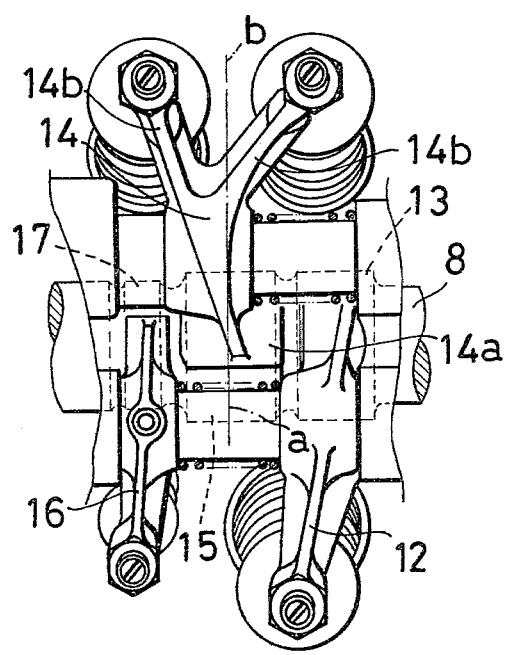
FIG. 5 is a top plan view of a valve-opening cam shaft portion of the auxiliary chamber.
Figure 6:
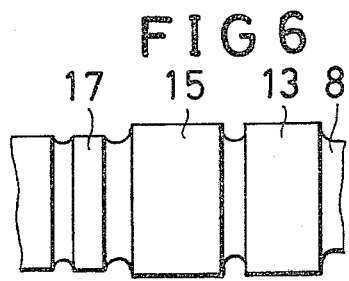
FIG. 6 is a top plan view of the cam shaft area.

The cam shaft 8, in valve operation, extends along the axial line of the crankshaft and, as shown in FIGS. 5 and 6, there is provided therein a cam 13 for operating the exhaust valve 7. This occurs through a rocker arm, an exhaust passage 12, a second cam for main intake 15 for operating the intake valves 5 through a rocker arm for main intake 14, and a third cam for a subsidiary intake 17, said third cam operating the subsidiary valve 10 through a subsidiary rocker arm 16.

As shown in FIG. 5, the rocker arm for main intake 14 has on its base portion a slipper 14a which is in contact with the cam for the main intake 15 and also has bifurcated arms 14b extending outwards. Said rocker arm is in engagement at the outer ends of the bifurcated arms 14b with the respective valve 5. In this case, in order that the pushing force of the cam 15 acting on the slipper 14a may be applied equally to the right and left of the bifurcated arms 14b, the center a of the contacting surface between the slipper 14a and the cam 15, and the center b between the outer ends of the bifurcated arms 14b, are substantially aligned with each other so that they are on a single common line.

Figure 4:
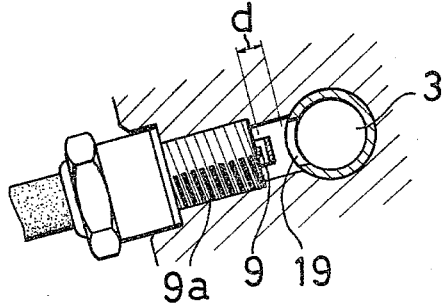
FIG. 4 is a sectional view taken along line 4—4 FIG. 3.

An electrode at the front portion of said ignition plug 9 is not always sufficiently cooled through scavenging and, especially, in the case of a high output engine, the same will be affected by a high temperature in the combustion chamber; thus pre-ignition is liable to occur. In order to prevent this, the ignition plug 9 and the auxiliary combustion chamber 3 are disposed at an angle to each other at their axial lines. Further, a passage 18 for cooling water is provided around an attaching threaded portion 9a of the ignition plug 9 so as to surround almost all of the circumference of said plug. In this case, it is preferable that the angle between the foregoing axial lines is in the range of 40 to 90 degrees. This will accomplish a positioning of the electrode of the ignition plug 9 within the range of 3 to 10 mm from the center of a plug opening 19 (of about 8-12 mm in diameter) made in the side wall of the foregoing cup-shaped collar. This distance range is shown by d in FIG. 4.

Additionally, the said torch passage 2 is directed towards the exhaust valve 7, so that formation of a flame in the main combustion chamber 1 is enhanced and the same is effective in decreasing the amount of unburned constituents.

The auxiliary combustion chamber 3 includes the said foregoing cup-shaped collar and is so arranged that it is exposed to the interior of the main combustion chamber 1. A bottom surface thereof is located substantially on a level with the top inner wall surface of the chamber 1, so that the interior of the chamber 3 can be kept at a high temperature. Consequently, the ignition characteristic thereof at the time of starting, especially in the case of small load, can be improved and, thus, the amount of unburned constituents can be decreased. Additionally, the collar does not obstruct spreading of a flame extending across the bottom surface of the collar and, as a result, the combustion in the direction of the auxiliary chamber can be improved.

Furthermore, the collar, i.e., the subsidiary combustion chamber 3, is so arranged to be positioned near to the center of the cylinder so that there is a shortened distance (generally termed the flame-spreading distance) from the torch passage 2 to the circumferential wall of the main combustion chamber 1. This has been found effective in shortening the combustion time and in improving the engine output. In this arrangement, one should provide for a distance of about 4 mm between, respectively, the collar and a valve seat of the exhaust valve 7, and between the collar and a valve seat of the intake valve 5 which is nearer to the collar. This is effective in preventing damage from thermal deformation. Furthermore, where the collar is mounted in the cylinder head with an annular gap surrounding the same, the thickness of the wall portion of the head is required to be 4 mm or more, thus providing futher protection against thermal deformation. Also, the collar provided near to the center of the cylinder assures a stable combustion even where an exhaust gas recirculation is effected for the main intake. The combustion can be completed within a short time even where a lean fuel mixture is used and, thereby, this arrangement is effective in decreasing the presence of $NO_x$.

Figure 7:
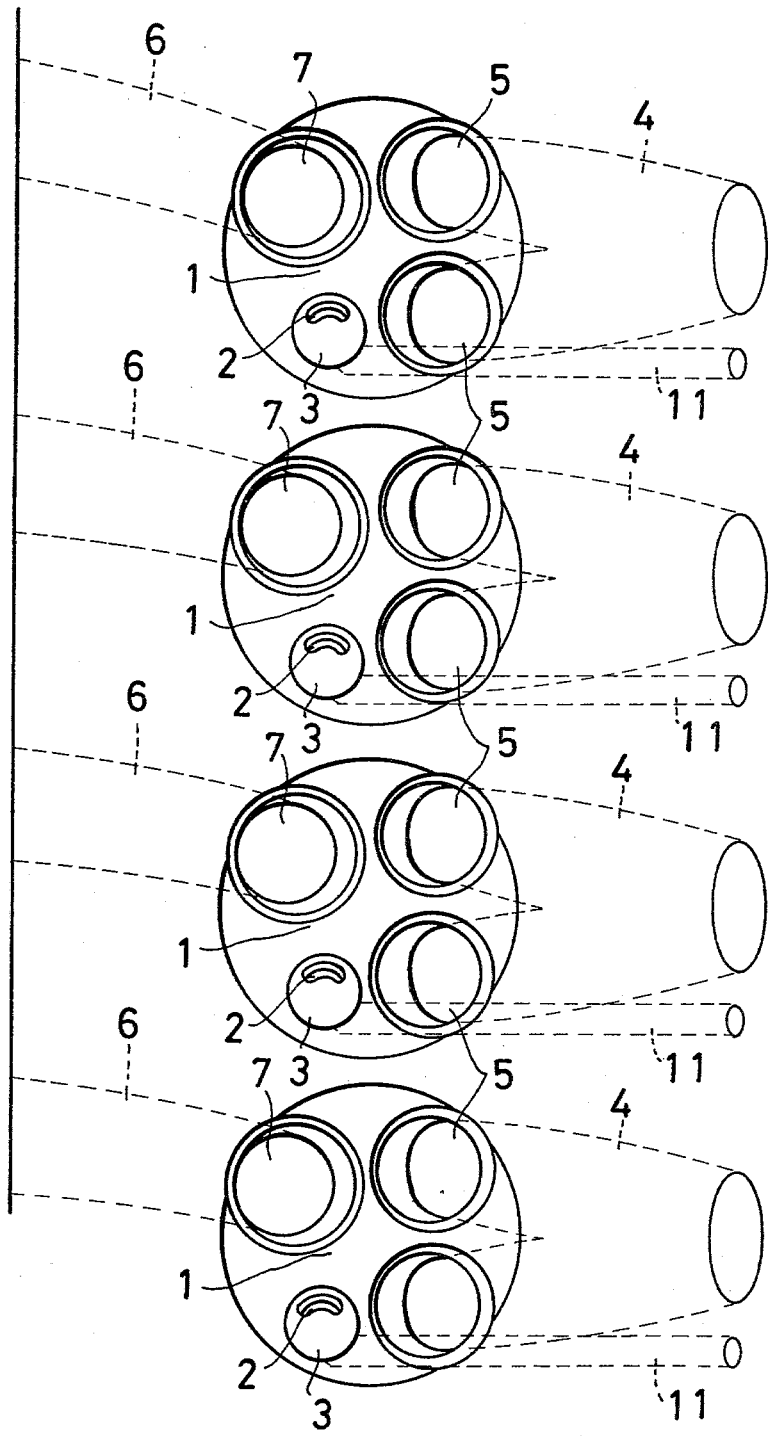
FIG. 7 is a conceptual diagram with reference to a multiple cylinder engine employing the present invention.

FIG. 7 shows an embodiment in which plural cylinders are provided in parallel, one with another, so that the engine is modified into a multiple cylinder by-pass type. In this case, it is preferable that all of the dispositions of the respective valves 5 and 7 on the respective main combustion chambers 1 in the respective cylinders be the same, wherein variations in timing of the combustion in the respective cylinders can be eliminated and the operation of the engine can become smoother.

The torch passage 2 formed in the collar comprises a circular or arc sectional opening; the size thereof is preferably about 35 to 90 $mm^2$. The volume of the subsidiary combustion chamber 3 is preferably 7 to 17% of the clearance volume.

Thus, according to the present invention, the engine is formed in a cross flow design through an arrangement in which the intake valve and the intake port, connected thereto, and the exhaust valve and the exhaust port, connected thereto, are disposed respectively on one side and the other side of the main combustion chamber. In this design, the intake element exhibits two valves on one side, so that the charging efficiency of the intake mixture can be improved and any delay in the intake of the mixture can be eliminated. Additionally, the wall portion of the main combustion chamber that is furthest from the auxiliary combustion chamber is cooled by the intake mixture and, thereby, such "knocking" as otherwise occurs at higher temperature is prevented.

While there have been herein shown and described the preferred embodiments of the present invention, it will be understood that the invention may be embodied otherwise than as herein specifically illustrated or described and that within said embodiments, certain changes in the detail and construction, and the form of arrangement of the parts may be made without departing from the underlying idea or principles of this invention within the scope of the appended claims.

Having thus described my invention what I claim as new, useful and non-obvious, and accordingly secure by Letters Patent of the United States is:

1. An internal combustion engine, comprising:
   (a) a main combustion chamber located at an upper portion of the interior of one cylinder; and
   (b) an auxiliary combustion chamber in communication with the main chamber through a torch passage,
   in which the main combustion chamber further comprises, on one side of a vertical plane extending along on an axial line of a crankshaft and including the center of the cylinder, two intake valves and an intake port connected thereto and, on the other side of the foregoing plane, a single exhaust valve and an exhaust port connected thereto and with the said auxiliary combustion chamber.

2. The internal combustion engine as recited in claim 1 in which said auxiliary combustion chamber comprises:
   a subsidiary intake valve and a subsidiary intake port extending therefrom towards the said one side of the plane through said intake valve.

3. The internal combustion engine as recited in claim 2, further comprising:
   a cam shaft extending along the axial line of the crankshaft is rotatably;
   a cam for exhaust;
   a cam for main intake;
   a cam for subsidiary intake; and
   a rocker arm for main intake which is in contact at a slipper of its base portion with the cam for main intake, the rocker arm being in engagement at its bifurcated forward ends with the two intake valves, and the center of the contacting surface between the slipper, the cam being positioned substantially in alignment with the center between the forward ends.

4. The internal combustion engine as recited in claim 2 in which said auxiliary combustion chamber further comprises:
   an ignition plug and a passage for cooling water provided around a base end threaded portion of the ignition plug surrounding most of the circumference thereof.

5. The internal combustion engine as recited in claim 1 in which the said torch passage is directed towards said exhaust valve.

6. The internal combustion engine as recited in claim 1, further comprising:
   a cup-shaped collar forming the auxiliary combustion chamber, the same being exposed at its bottom portion to the interior of the main combustion chamber, the collar having a bottom surface located substantially on a level with one wall surface of the main chamber.

7. The internal combustion engine as recited in claim 6 in which said collar is disposed near to the center of the cylinder.

8. The internal combustion engine as recited in claim 1 further comprising:
   plural cylinders provided in parallel one to another forming an engine of multiple cylinders having valve dispositions on the respective sylinders which are the same as each other.

* * * * *